Patented July 24, 1951

2,562,036

UNITED STATES PATENT OFFICE 2,562,036

METHOD OF MAKING DISUBSTITUTED PIPERAZINES

Martin Everett Hultquist, Bound Brook, and Kenneth Leon Howard, Westfield, N. J., assignors to American Cyanamid Company, New York, N. Y., a corporation of Maine No Drawing. Application October 14, 1948, Serial No. 54,573

5 Claims. (Cl. 260—250)

The present invention relates to 1,4-disubstituted piperazines. More particularly, it relates to the preparation of 1,4-disubstituted piperazines in which one N-substituent is a five or six membered heterocyclic ring containing at least one nitrogen as a heterocyclic atom, and to the compounds so produced. More specifically, the new piperazine derivatives of the present invention may be represented by the following generic formula:

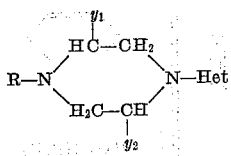

in which R is an alkyl, cycloalkyl, aryl, or aralkyl radical; Het is the heterocyclic radical, the bond from the 4-nitrogen to the heterocyclic radical being to the latter in a position adjacent to a heterocyclic nitrogen; and $y_1$ and $y_2$ are each hydrogen or lower alkyl radicals.

The group designated by R may be quite widely varied. It may represent variously, an alkyl radical, usually of about one to six carbon atoms such as methyl, ethyl, propyl, isopropyl, butyl, isobutyl, amyl, isoamyl, hexyl and the like. It may be a substituted alkyl, such as a hydroxyalkyl or an alkamine, i. e., dialkylaminoalkyl and the like. It may also be a cycloaliphatic radical such as cyclohexyl, ethylcyclohexyl and the like; an aryl radical such as phenyl, tolyl, xylyl, naphthyl, or a halogen- or hydroxy-substituted derivative thereof; or an aralkyl radical such as benzyl, phenylethyl, methoxy-phenylmethyl or the like.

The group designated as Het is 5- or 6-membered nitrogen-containing heterocyclic radical. It may be substantially any such radical provided the bond thereto is a position adjacent to a heterocyclic nitrogen. Examples include 2-pyridyl, 2-pyrimidyl, 2-pyrazyl, 3-pyridazyl, 2-thiazyl, and their alkyl- or halogen-substituted heterocyclic ring derivatives.

The compounds of the present invention being 1,4-disubstituted piperazines, the latter ring is shown as saturated. However, in addition to the 1,4-substituents, the carbon atoms of the ring may also be substituted. As shown in the generic formula above, $y_1$ and $y_2$ may be either hydrogen or a lower alkyl group, particularly the methyl and ethyl radicals. The invention therefore contemplates 1,4-disubstituted mono- and di-alkyl substituted piperazines such as 2-methyl or ethyl piperazine, 2,5 and 2,6-dimethyl and diethyl piperazines.

The novel compounds of the present invention vary in physical character from colorless or light yellow oils, as in those cases where R is a lower alkyl radical, to colorless to yellow crystals where R is an aryl or aralkyl radical. These compounds are somewhat basic in character. Acid addition salts thereof are in general not too well defined, particularly when R is an aryl or aralkyl. Stable, water-soluble salts such as the hydrochloride, hydrobromide, citrate, or sulfate may generally be prepared from bases where R is alkyl or cycloalkyl. Some form with water or crystallization, and some are even hygroscopic. In some cases it may be desirable to form quaternary salts such as the methobromide, ethiode and the like. These may be prepared directly from the base in the usual way. The bases are only slightly soluble in water, but generally soluble in chloroform, ether, the lower alkanols and, to a varying degree, in naphtha.

Preparation of the compounds is readily accomplished. One general procedure utilizes a suitable 1-substituted piperazine, i. e., a methyl, ethyl, phenyl, chlorophenyl, tolyl, phenylethyl, cyclohexyl, or the like piperazines, which is generally available per se or as a salt thereof, such as the hydrochloride. Piperazines with substituents other than nitrogen substituents, 2,5-dimethyl piperazine, for example, may be used. Either the base or the salt may be used. This is reacted with a halogen-substituted heterocyclic compound having the structure which is to be substituted on the other nitrogen.

The reaction is preferably carried out in the presence of an aqueous alkaline solution. Heating and agitation are usually required, ordinarily temperatures from about 125°–200° C. being employed. Heating at these temperatures is maintained for sufficient time to insure the reaction being carried as far as possible to completion. About 3 to 20 hours is usually required, although this time may increase or decrease, depending upon the heterocyclic compound being used and depending also upon the batch size and/or the temperature used. An exception occurs in the cases where halogen-substituted pyrimidines are utilized, for chloro or bromo-pyrimidines generally react exothermically with or without a solvent even under atmospheric conditions when the reaction is once initiated.

Isolation is relatively simple. Where the product forms an insoluble precipitate in the reaction mixture, it may be isolated by filtration and purified by distillation or recrystallization from a suitable solvent, dilute alcohol, or naphtha, for example. When the product is in the form of an oil, it may be extracted with a solvent, such as ether, isopropyl acetate, or the like. This extract may be dried and the product isolated and purified by distillation or isolated by precipitation from the solvent as its acid addition salt, such as the hydrochloride. The latter salt may be purified by recrystallization from a suitable solvent, such as alcohol, or a solvent mixture, such as alcohol-ether, alcohol-isopropyl acetate, or the like.

Where it is desirable and possible to form a pure, stable acid salt of these new compounds, this may be accomplished by dissolving the free piperazine product in an essentially anhydrous solvent, adding an essentially anhydrous acid or acid solution to it, and isolating in any of the usual ways the salt thus formed. Acids useful in the preparation of such salts are hydrochloric, sulfuric, citric, hydrobromic and the like.

Typical compounds in accordance with the present invention include the following:

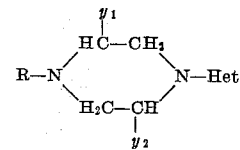

where $y_1$ and $y_2$ are H, methyl, or ethyl and R and Het have the following values:

These compounds have been found to be pharmacologically active in various ways. Many of them have been found to show anti-spasmodic action, particularly against neurotropic spasm. More important, a number of the compounds have been found to possess particularly good analgesic properties.

The invention will be more fully illustrated in conjunction with the following examples which are meant to be illustrative only and not by way of limitation. All parts are by weight unless otherwise noted.

EXAMPLE 1

1-phenyl-4-(2-pyridyl)piperazine 1-phenylpiperazine is obtained as an oil by the treatment of 39 parts of 1-phenylpiperazine dihydrochloride (Pollard and MacDowell, J. A. C. S. 56, 2199 (1934)) with an excess of an aqueous 33% caustic soda solution. To this oil is added 14 parts of 2-bromopyridine and 45 parts of 17.5% aqueous caustic soda, and the suspension is heated in an autoclave for 6 hours at 150° C. The 1-phenyl-4-(2-pyridyl)piperazine, after three recrystallizations from dilute alcohol, melted at 108°–109.4° C.

EXAMPLE 2

1-phenyl-4-(2-pyrazinyl)piperazine

A suspension comprising 194 parts 1-phenylpiperazine, 92 parts of 2-chloropyrazine and 140 parts of a 20% aqueous sodium hydroxide solution is heated, with shaking, for 5 hours at 200° C. The crude solid material resulting from the reaction is dissolved in 4000 parts of alcohol, filtered, and the filtrate is treated with an equal volume of water to separate a product which is distilled (B. P. 198°–200° C. at 2 mm.) and the yellow-colored distillate is recrystallized from alcohol as a bright yellow crystalline product which melts at 119°–120° C.

EXAMPLE 3

1-pheny-4-(2-pyrimidyl)piperazine

To 48.6 parts of 1-phenylpiperazine is added 23 parts of 2-chloropyrimidine. The reaction mixture heats spontaneously and ice-water cooling is necessary. The reaction product is dissolved in 400 parts of five normal hydrochloric acid, filtered, the filtrate being then treated with 100 parts of 50% aqueous sodium hydroxide whereupon a solid separates. This solid after distillation (B. P. 180°–214° C. at 6 mm.) is crystallized from alcohol as a white crystalline material melting at 82°–83.2° C.

EXAMPLE 4

1-phenyl-4-(5-chloro-2-pyrimidyl)piperazine

To 81 parts of 1-phenylpiperazine is added 30 parts of 2,5-dichloropyrimidine. The reaction, which begins spontaneously may be moderated by cooling with ice-water. The product of the reaction is dissolved in hot dilute hydrochloric acid which contains 50% of ethanol. The product which separates on cooling is the hydrochloride which melts at 245°–248° C. The hydrochloride is dissolved in hot dilute aqueous ethanol and is treated with sodium hydroxide whereon the base separates out. The base is recrystallized from hot varnish makers' naphtha as a white product which melts at 116.6°–117.5° C.

EXAMPLE 5

1-methyl-4-(2-pyridyl)piperazine dihydrochloride

To 95 parts of 1-methylpiperazine dihydrochloride monohydrate and 50 parts of 2-bromopyridine is added a solution of 65 parts sodium hydroxide in 235 parts of water. The mixture is heated for 20 hours at 150° C. in an autoclave and cooled, the cooled solution being then extracted with ether, and the ether layer dried over anhydrous sodium sulfate. Treatment of the ethereal solution with gaseous hydrogen chloride causes the separation of 1-methyl-4-(2-pyridyl)piperazine dihydrochloride. This dihydrochloride is crystallized from alcohol as the hemihydrate (M. P. 242°–260° C. with decomposition).

EXAMPLE 6

1-methyl-4-(2-pyrazinyl)piperazine dihydrochloride

A suspension of 9.6 parts of chloropyrazine in a solution previously prepared from 19 parts of 1-methylpiperazine dihydrochloride monohydrate in 115 parts of a 30% aqueous sodium hydroxide solution is heated in an autoclave at 200° C. for 16 hours and cooled. The cooled alkaline solution is extracted with ether, and the ether extract is treated with alcoholic hydrogen chloride. A precipitate of a tan-colored dihydrochloride occurs. This salt melts at 243°–245° C.

EXAMPLE 7

1-methyl-4-(2-pyrimidyl)piperazine dihydrochloride

To a solution of 125 parts of 1-methylpiperazine dihydrochloride monohydrate in 690 parts of a 13.8% sodium hydroxide solution is added, at 70° C. over a period of 15 minutes, 57 parts of 2-chloropyrimidine. The mixture is heated and stirred at 95°–98° C. for one hour and cooled. An oily product forms and is separated from the aqueous layer. This oil is dissolved in absolute ether, and is precipitated by the addition of excess dry hydrogen chloride. The hydrochloride is recrystallized from alcohol. It melts with decomposition over the range 266°–284° C.

EXAMPLE 8

1-methyl-4-(2-thiazolyl)piperazine dihydrochloride 40 parts of 2-chlorothiazole is suspended in a solution of 95 parts of 1-methylpiperazine dihydrochloride monohydrate in 300 parts of a 22% aqueous sodium hydroxide. This mixture is heated for 5 hours at 150° C. in an autoclave. The product is filtered and the aqueous layer is extracted with ether. Ether is removed from the extract and the residue is distilled. The fraction boiling at 140°–141° C. at 3 mm. pressure is collected, dissolved in ethanol, treated with hydrogen chloride and the resultant salt is collected. The hydrochloride softens at about 242° C. and melts at 245°–247° C.

EXAMPLE 9

1-benzyl-4-(2-thiazolyl)piperazine hydrochloride

To 75 parts of water is added 160 parts of 50% sodium hydroxide solution, 80 parts of 2-chlorothiazole and 164 parts of 1-benzylpiperazine. The reaction is heated in an autoclave at 150° C. for 5 hours. Sufficient water is added to dissolve the salts. The oil layer, which separates, is dried over anhydrous potassium carbonate. The oil is dissolved in 55 parts of absolute ethyl alcohol and anhydrous hydrogen chloride is introduced until the slurry is acidic to Congo red paper. The product, after isolation by filtration, may be crystallized from n-propyl alcohol; M. P. 250° C.

EXAMPLE 10

1-benzyl-4-(2-pyrazinyl)piperazine

To 75 parts of water there is added 164 parts of 1-benzylpiperazine, 92 parts of 2-chloropyrazine and 160 parts of 50% sodium hydroxide solution. The reaction is heated in an autoclave at 200° C. for 5 hours. After cooling, 1000 parts of water are added and the product is extracted with 840 parts of ether. The ether solution is dried over anhydrous sodium sulfate and the ether is removed by distillation. The oil residue crystallizes on the addition of 150 parts of petroleum ether; M. P. 83°–83.5° C.

EXAMPLE 11

1-(4-chlorophenyl)-4-(2-pyrazinyl)piperazine

To 160 parts of 25% sodium hydroxide solution add 116.5 parts of 1-(4-chlorophenyl)piperazine hydrochloride and 46 parts of 2-chloropyrazine. The reaction is heated in a shaking autoclave at 200° C. for 5 hours. After cooling, the heavy paste is extracted with 640 parts of boiling methanol and clarified with Hyflo. The crude product, which crystallized from the solution on cooling, may be crystallized from benzene and petroleum ether; M. P. 111°–112° C.

EXAMPLE 12

1-(4-chlorophenyl)-4-(2-thiazolyl)piperazine

To 8.15 parts of 1-(4-chlorophenyl)piperazine hydrochloride, 17.9 parts of 2-chlorothiazole and 60 parts of 50% sodium hydroxide in an autoclave are added 60 parts water. The reaction mixture is heated for 5 hours at 150° C., cooled, and the liquid phase is decanted and discarded. The solid residue is extracted in portionwise with 240 parts of methanol. The solid which crystallizes from the chilled methanol extract is dissolved in dilute hydrochloric acid, treated with decolorizing charcoal, filtered, and reprecipitated from the filtrate by addition of caustic. Further purified by recrystallization from a benzene-petroleum ether mixture, the above piperazine mlts at 119°–120° C.

While in the foregoing examples the same general method has been followed, i. e., the introduction of a 4-heterocyclic substituent on a 1-substituted piperazine, this is not the only method that may be followed. For example, it is equally practicable to introduce an alkyl, cycloalkyl, or aralkyl group into the 4-position on a 1-heterocyclic piperazine. The particular conditions of the reaction are dependent upon the type of substituent to be introduced. For example, a methyl group may be introduced by reductive alkylation or by a direct methylation. Similarly, other alkyl, cycloalkyl or aralkyl radicals may be added by direct alkylation. An alcoholic or aqueous alkaline medium may be used, depending on the procedure being followed. These procedures are shown by way of illustration in the following examples.

EXAMPLE 13

1-(2-pyridyl)-4-(2-hydroxyethyl)piperazine dihydrochloride

To 25.5 parts of 1-(2-pyridyl)piperazine in 50 parts by volume of methanol is added 7.9 parts of ethylene oxide. The temperature of the reaction mixture rises after the addition, and the resulting mixture is allowed to stand and cool of its own accord. Alcoholic hydrogen chloride is added until the mixture is acidic. The solid which separates is collected, washed with alcohol, and air-dried. It may be further purified by recrystallization from alcohol. Thus treated, it softens at 241°–245° C. and decomposes at 250° C.; by analysis it was shown to be a one-quarter hydrate of the dihydrochloride.

EXAMPLE 14

1-(2-dimethylaminoethyl)-4-(2-pyridyl)piperazine hydrochloride

To 25.5 parts of 1-(2-pyridyl)piperazine and 32 parts of sodium carbonate in 100 parts by volume of boiling benzene are slowly added 34 parts of dimethylaminoethyl chloride hydrochloride. Refluxing is continued for 6 hours and then the reaction mixture is filtered hot. Removal of the benzene from the filtrate by distillation leaves an oil. The oil, when treated with one equivalent of hydrogen chloride in alcohol followed by addition of ether, is transformed to a solid hydrochloride. After recrystallization from an alcohol-ether mixture, this monohydrochloride melts at 184°–186.5° C.

EXAMPLE 15

1,2,5-trimethyl-4-(2-pyridyl)piperazine

To a solution of 36 parts of 1-(2-pyridyl)-2,5-dimethylpiperazine in 31 parts of 90% formic acid, heated to 80° C., are gradually added 24 parts of 35% aqueous formaldehyde. The temperature of the heating bath is slowly raised to 140° C. and kept at that temperature for 2 hours. The solvent is then allowed to distill over a period of 4 hours while the bath temperature is gradually raised to 200° C. The reaction mixture is cooled, poured onto ice, made alkaline with caustic, and extracted with ether. After drying, the ether is removed by distillation, leaving the desired product as an oil. The oil may be converted to addition salts in the usual way. The citrate softens at 115°–124° C. and decomposes at 140°–146° C.

We claim:

1. A process of preparing substituted piperazines selected from the group consisting of compounds having the formula:

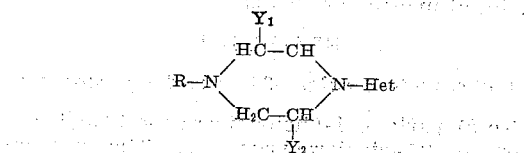

and acid addition salts thereof in which $Y_1$ and $Y_2$ are selected from the group consisting of hydrogen, ethyl, and methyl, R is a radial selected from the group consisting of the alkyl, amino- and hydroxy-substituted alkyl radicals of 1-6 carbon atoms, the cyclohexyl, phenyl, tolyl, naphthyl, and benzyl radicals and the halogen-substituted phenyl and tolyl radicals, and Het is a radical selected from the group consisting of the pyridyl, pyridazyl, pyrimidyl, pyrazinyl and thiazolyl radicals; which comprises reacting a 1-substituted piperazine, selected from the group consisting of compounds of the formula:

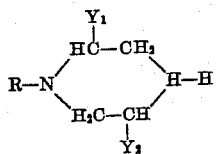

and

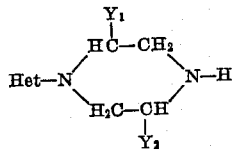

wherein R, Het, $Y_1$ and $Y_2$ have the values noted above, with a compound selected respectively from the group consisting of (Het—Hal) and a compound selected from the group consisting of alkylene oxides, formaldehyde, and (R'—Hal) wherein Het has the values noted above, R' is a radical selected from the group consisting of the alkyl, amino- and hydroxy-substituted alkyl radicals of 1 to 6 carbon atoms, the cyclohexyl and benzyl radicals and Hal represents a member of the group consisting of bromine, iodine, and chlorine radicals; separating from the reaction product the 1,4 disubstituted piperazine and purifying the latter.

2. A process according to claim 1 in which the reaction is carried out in the presence of a basic acceptor for hydrohalides.

3. A process according to claim 1 in which the 1,4-disubstituted piperazine is treated in solution with a quaternary salt-forming compound and the salt is separated out, collected and purified.

4. A process according to claim 1 in which the reaction product is dissolved in a solvent and treated with a salt-forming inorganic acid, whereby an addition salt forms and the salt is separated out and collected.

5. A process according to claim 4 in which the reaction product is treated with the salt-forming inorganic acid prior to purification and the addition salt is purified.

MARTIN EVERETT HULTQUIST.
KENNETH LEON HOWARD.

No references cited.